United States Patent [19]

Johner et al.

[11] 4,311,882

[45] Jan. 19, 1982

[54] METHOD OF AND ARRANGEMENT FOR TESTING TRAFFIC ROUTES IN TELECOMMUNICATION NETWORKS

[75] Inventors: Wilfried Johner, Langnau; Willy R. Haerry, Thalwil; Paul A. Heman, Obfelden, all of Switzerland

[73] Assignee: International Standard Electric Corporation, New York, N.Y.

[21] Appl. No.: 110,565

[22] Filed: Jan. 7, 1980

[51] Int. Cl.³ .................. H04M 1/24; H04M 3/30; G06F 11/00; H04J 3/14
[52] U.S. Cl. .................. 179/175.2 D; 370/13; 371/22
[58] Field of Search .......... 370/13; 371/22, 15, 371/29; 179/175, 175.2 C, 175.2 D

[56] References Cited

U.S. PATENT DOCUMENTS

| | | | |
|---|---|---|---|
| 3,829,627 | 8/1974 | Short et al. | 179/175.2 D |
| 3,943,348 | 3/1976 | Akriche et al. | 371/22 |
| 4,138,599 | 2/1979 | Munter | 370/13 |
| 4,208,552 | 6/1980 | Castriotta et al. | 179/175.2 D |

Primary Examiner—Thomas A. Robinson
Attorney, Agent, or Firm—John T. O'Halloran; Jeffrey P. Morris

[57] ABSTRACT

One central unit (NQTC) provided per network section controls a number of remote units (NQTR) distributed over the network section by transmitting to them all data needed for a sequence of test calls via a switched line. The remote units perform the test calls independently based on stored data and store the test results, which results are periodically requested by the central unit. Since a data connection between the central unit and one of the remote units has to be provided only during the data input period; and since the request of results and the remote units work independently during the substantially longer test phase period, there is only a small number of line circuits and modems needed in the central unit; however, a large number of simultaneous test calls can be performed in a network section. The central control can be handled by a processor of small capacity since the processor need not perform any real time work.

5 Claims, 2 Drawing Figures

BLOCKDIAGRAM OF THE NQTC

BLOCKDIAGRAM OF THE NQTC

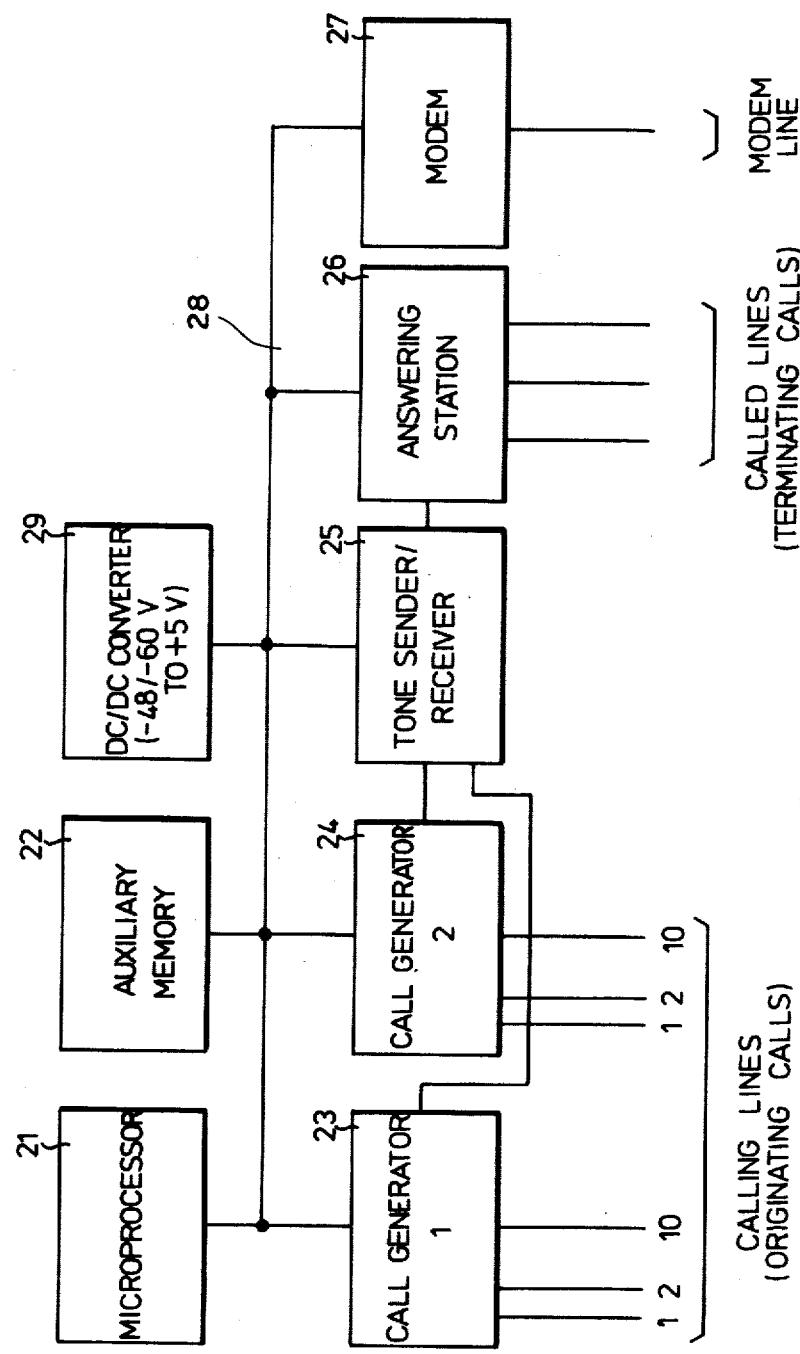
Fig.2  BLOCKDIAGRAMS OF THE NQTR

METHOD OF AND ARRANGEMENT FOR TESTING TRAFFIC ROUTES IN TELECOMMUNICATION NETWORKS

BACKGROUND OF THE INVENTION

The present invention relates to a method of and an arrangement for testing traffic routes in a telecommunication network.

With aid of the traffic route testing the grade of service of a telecommunication network can be checked and, provided the tests are performed in short inervals, the grade of service can be monitored. The test is done by setting up test calls between different points of the network. In the following description the grade of service is defined as the availability of the telecommunication network to a telephone subscriber, i.e. whether and after what period of time the subscriber, after having lifted the telephone handset, receives the dial tone; and whether and after what period of time after dialling, the ringing tone occurs; and whether the subscriber line loss for both directions of transmission lies within given values, whether the metering is correct, whether the release is done correctly.

As already mentioned, for the test of traffic routes, there are test calls set up by test apparatus to test stations provided with automatic answering devices and arranged within the different exchanges of the telecommunication network; and based on the results of the test calls, there is given evidence of the grade of service.

There are known different methods of and arrangements for testing traffic routes. In the easiest case, there is only tested whether and within what period of time a calling subscriber receives a dial tone. With more sophisticated methods, there is set up a complete connection with testing of both directions of transmission. The method of the present invention relates to a method of the last mentioned kind.

In "Ericsson-Review" 3/74 p. 80-87, there is described a traffic route tester setting up complete two-way connections. Said traffic route tester cooperates with a central processor as the controlling unit at a central point of the telecommunication network which processor controls traffic producing units in the exchanges via modems and switched lines or via through-connected lines which units set up test calls to other exchanges and transmit back the test results. The number of the simultaneously performable test calls within the telecommunication network is given by the number of the modems and/or through-connected lines available for the central unit. The number of test calls per time unit performable via a modem or a through-connected line is given by the time needed for setting up the call and transmitting back the result.

It is desirable to use a traffic route test not only for receiving statistical data concerning the grade of service of a telecommunication network, but also for monitoring the grade of service in an almost realtime manner. For this purpose, it would be necessary to have a rather large number of test calls per time unit between two exchanges in order to receive the desired realtime knowledge of the grade of service.

With the above described prior art traffic route tester, this would require a large number of modems with a corresponding charge to the exchange housing, the central unit wih unpaid test traffic or a large number of expensive through-connected lines and further, a very fast processor in the central unit due to the large data traffic.

It is, therefore, a primary object of the invention to provide a method of and an arrangement for testing traffic routes enabling the monitoring of the grade of service in a realtime manner without the aforementioned drawbacks.

A preferred embodiment of the present invention is described with reference to the accompanying drawings in which:

BRIEF DESCRIPTION OF THE DRAWINGS

FIG. 2 shows a block diagram of a remote test unit.

DESCRIPTION OF THE PREFERRED EMBODIMENT

Figure 1:
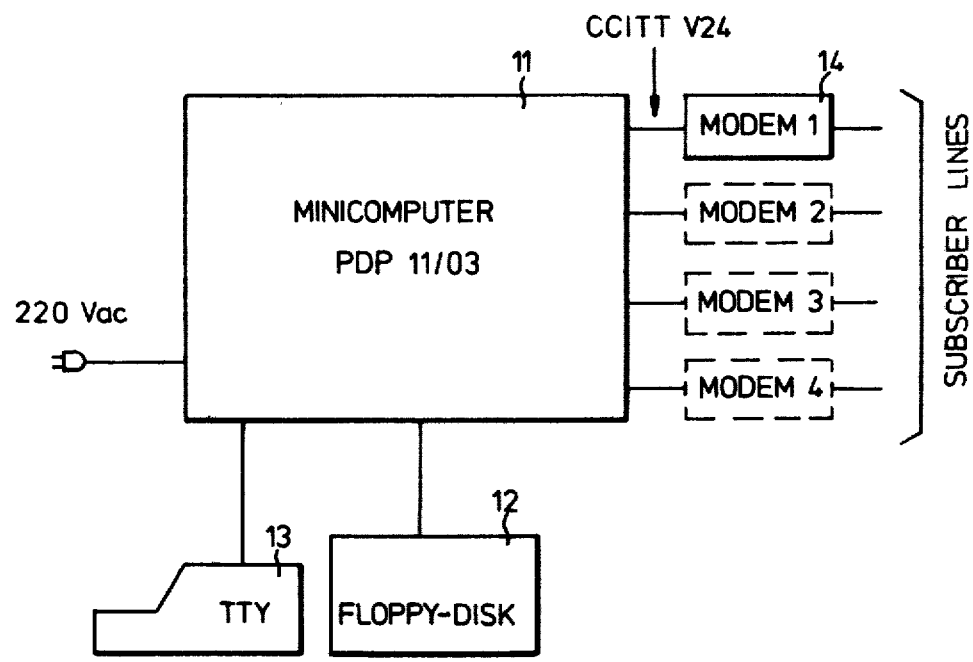
FIG. 1 shows a block diagram of the central unit of a traffic route tester.

The central unit NQTC shown in FIG. 1 consists of a processor 11, a memory unit 12, e.g. a floppy-disk store, a teletyper 13 as the input/output device and of a number of modems 14 via which a central unit is connected with the telecommunication network and which contain devices to set up calls with the remote test units under the control of the processor 11.

The central unit NQTC has the following functions:
handling of the man-machine dialog;
handling of the network data such as:
subscriber numbers of the modem connections to all remote units NQTR;
subscriber lines and categories of all NQTR's;
subscriber number of all answering stations of the network;
admissible thresholds for fault rates;
storage of the test sequences and initialization of the tests by calling up the various NQTR's and transmitting the test data to them;
collecting test results data from the individual NQTR's; and
interpretation and printing of the test results.

The remote unit NQTR shown in FIG. 2 comprises a microprocessor 21 with an additional memory 22 having a PROM-part and a RAM-part; and further including two call generators 23 and 24, a voice frequency transmitter/receiver 25, one or more answering stations 26, a modem 27, all these components being interconnected by a data bus 28. Additionally, there is provided a power supply unit 29 to supply the feeding power for all these units from the exchange battery.

Within a telephone network or network portion, there is provided only one central unit NQTC as shown in FIG. 1 whereas the remote test unit is provided for each exchange, the trunks and switching paths of which are required to be tested. The remote test unit NQTR contains, as already described, both the calling and the answering portion for test calls so that different devices can be used in common. Pure answering stations would be possible such that when they are called, they transmit back a voice frequency signal. However, if the check of the grade of service of a network portion is required to be complete, each exchange of a network portion calls up each other exchange of this portion for test connections; and each exchange must be provided both with calling and with answering stations so that the combination of the calling and the answering portion into a remote test unit NQTR identifies itself.

As aforementioned the apparatus for the automatic traffic route test consists of:

remote units NQTR which are equipped for every exchange and of a central unit NQTC which is equipped once per network portion.

The remote units NQTR operate under the control of their respective microprocessors as self-standing units and carry out test calls to automatic answering stations in the same exchange and in all other exchanges and store the test results. For this reason, the remote unit NQTR is equipped with a number of subscriber lines (up to 20) which are used to set up the calls. The automatic answering stations are also connected to subscriber lines. The remote unit NQTR can set up two calls at the time via one of a maximum of 10 subscriber lines. The remote unit NQTR receives the data for the test calls to be carried out through a data interchange via modems from the central unit NQTC. The latter requests the test results periodically and evaluates them. It is always the central unit NQTC which plays the active role for setting up data connections between NQTC and NQTR which central unit calls the different remote units NQTR via the switching network on demand or periodically. The operating and the supervision of the whole system is done exclusively at the location of the central unit NQTC.

The operation of the automatic traffic route test will now be described in more detail. In the central unit NQTC, all data relating to the test sequences to be carried out periodically, the subscriber numbers of the modem connections to the different remote units NQTR, the subscriber lines and categories of the different connections in the remote units, the subscriber numbers of the answering stations in the different exchanges and the admissible fault rates are stored in memory 12. If the starting time of an automatic test sequence arrives or if a distinct test sequence is manually started by a man-machine dialog, the central unit NQTC sets up a data connection via the switching network to the modem connection of the respective remote unit NQTR and transmits via this data connection all data relating to the subscriber numbers to be used, including their categories, to the subscriber numbers of the answering stations to be called, and further including the type of test calls (with/without meter pulse test, with/without synchronization, time intervals, starting time), and further including the parameter of the exchange and the start and stop time of the test.

The remote unit NQTR then carries out the test calls independently and classifies the results per answering station, per type of fault and per calling line. The central unit NQTC scans periodically all remote unit NQTR and asks for results of the test via a data connection.

The data received are then processed by the central unit NQTC into a statistical overview and printed out in accordance with the mode of printing, i.e. periodically or immediately if a threshold for a fault rate is exceeded. All test data needed can be altered by a man-machine dialog via the input/output device 13. The last look of this data is stored in the memory 12 so that the data is not lost in case of a mains breakdown.

With the aid of the present apparatus the following types of tests can be carried out:
quality of service test for all routes;
quality of service test for a predeterminate route per exchange; and test with holding the line in case of a fault.

The test results can be printed out in the following different ways:
per route (bundle), on demand or periodically;
per route if a certain threshold for the fault rate is exceeded;
per calling line on demand;
per calling line if a certain threshold for the fault rate is exceeded.

The faults can be classified per route according to the following types:
no dial tone;
route busy;
subscriber busy;
no ringing tone;
no answering signal;
no metering;
wrong metering;
loss too high in the speed path; and
wrong release.

The tests can be performed with measuring the delay between two meter pulses or without meter test. It is obvious that with a meter test the holding time per call is longer; and consequently, fewer test calls can be made per time unit.

The tests can be run in a synchronous or an asynchronous mode. In the synchronous mode, the calls from the various remote units NQTR are started in fixed time intervals and with staggered delays in such a manner that never more calls have to be answered simultaneously, as there are answering stations in an exchange. In this way, falsification of the test results due to busy answering stations can be avoided.

As can be seen from the foregoing there is a division of labor between the central unit NQTC and the remote unit NQTR, the latter being kept as simple and passive as possible. The remote unit NQTR contains in the PROM-portion of memory 22 only the programs allowing the unit to independently set up the calls ordered by the central unit NQTC and to store the results in counters of the memory. The remote unit NQTR does not interpret the test results but only transmits the test results to the central unit NQTC on request of the latter, which subsequently interprets the test results and prints them out.

All semi-permanent data for a specific test sequence are sent from the central unit NQTC via modem and switched line to the remote unit NQTR and stored there in the RAM-portion of store 22. Therefore, no back-up memory is needed in the remote units NQTR and alterations of these data can be carried out simply by means of a man-machine dialog at the central unit NQTC.

It is obvious that these data are lost in the case of a mains failure. If power is restored, the remote unit NQTR makes an automatic restart, but it then waits until the central unit NQTC calls on it the next time to transmit the semi-permanent data anew.

In summary, the present traffic route tester enables the remote units NQTR to be able to independently set up calls and to store the results whereas the central unit NQTC is able to communicate periodically with the remote units NQTR in order to request therefrom test results and to enter then data for new test sequences.

By this design of the central unit NQTC, and the remote units NQTR there results the following advantages:
since each remote unit NQTR is able to perform independently one or more test calls, there is no longer a limitation on the number of the test calls to be performed simultaneously within a network section, i.e. the information concerning the quality of service obtained by the test calls approaches realtime information:

the central unit NQTC is discharged from realtime control duties so that a processor of small capacity can process the traffic route test;

a data connection between the central unit NQTC and one of the remote units NQTR is only needed during a short period of time for requesting the test results and starting a new test sequence, which data transmission can be done via switched line. Therefore, the central unit NQTC needs only a small number of line circuits with modems since it can communicate with the different remote units NQTR in a timely staggered manner. Therefore, the additional test traffic for the exchange housing the central unit remains within admissible limits.

What is claimed is:

1. Method of traffic route testing in a telecommunication network with the aid of a central processing unit and a plurality of remote processing units wherein test calls are set up between calling stations and automatic answering stations, wherein the central processing unit transmits to each of the remote processing units the data needed for performing a sequence of test calls, and wherein the remote processing unit stores said data and based thereon independently sets up the test calls, detects the test results and stores them, and further wherein the central processing unit requests the test results from each of the remote processing units whereby a data connection between the central processing unit and the respective remote processing unit is set up for the duration of the data transmission.

2. Method according to claim 1, wherein the data connections between the central processing unit and the remote processing units are set up via switched lines and modems.

3. Method according to claim 1, wherein the data needed for the test calls are stored in the remote processing unit and are electrically alterable such that the data traffic between the central processing unit and the remote processing units is limited to alterations of the stored data, to the start order for a sequence of test calls and to the request of the test results.

4. Method according to claim 3, wherein with a synchronous mode of operation of the remote processing units an answering station is not called at the same time a test call is in process and wherein test calls are performed in a fixed time scheme under the control of the central processing unit, with a time interleaving of the calls to a distinct answering station being performed by a predetermined choice and starting of the test sequences of the individual remote processing units.

5. Method according to claim 1, wherein the central processing unit interprets the test results requested from the individual remote processing units, prints them out and gives an alarm if the number of faults exceeds a given threshold value.

* * * * *